(12) United States Patent
Chacko et al.

(10) Patent No.: US 9,236,191 B2
(45) Date of Patent: Jan. 12, 2016

(54) MATERIALS AND METHOD FOR IMPROVING CORNER AND EDGE COVERAGE OF SOLID ELECTROLYTIC CAPACITORS

(71) Applicant: Kemet Electronics Corporation, Simpsonville, SC (US)

(72) Inventors: Antony P. Chacko, Simpsonville, SC (US); Yang Jin, Simpsonville, SC (US); Randolph S. Hahn, Simpsonville, SC (US); Yongjian Qiu, Simpsonville, SC (US); Philip M. Lessner, Simpsonville, SC (US); Keith R. Brenneman, Simpsonville, SC (US)

(73) Assignee: Kemet Electroncis Corporation, Simpsonville, SC (US)

( * ) Notice: Subject to any disclaimer, the term of this patent is extended or adjusted under 35 U.S.C. 154(b) by 0 days.

(21) Appl. No.: 14/490,981

(22) Filed: Sep. 19, 2014

(65) Prior Publication Data

US 2015/0135496 A1    May 21, 2015

Related U.S. Application Data

(62) Division of application No. 13/396,842, filed on Feb. 15, 2012, now Pat. No. 9,030,807.

(60) Provisional application No. 61/443,051, filed on Feb. 15, 2011, provisional application No. 61/443,622, filed on Feb. 16, 2011.

(51) Int. Cl.
| | | |
|---|---|---|
| *H01G 9/00* | (2006.01) | |
| *H01G 9/028* | (2006.01) | |
| *H01G 9/052* | (2006.01) | |
| *H01G 9/15* | (2006.01) | |
| *H01G 9/042* | (2006.01) | |
| *B05D 1/18* | (2006.01) | |
| *B82Y 99/00* | (2011.01) | |

(52) U.S. Cl.
CPC .............. *H01G 9/0032* (2013.01); *B05D 1/185* (2013.01); *H01G 9/0036* (2013.01); *H01G 9/028* (2013.01); *H01G 9/0425* (2013.01); *H01G 9/052* (2013.01); *H01G 9/15* (2013.01); *B82Y 99/00* (2013.01); *Y10S 977/948* (2013.01); *Y10T 29/417* (2015.01); *Y10T 29/43* (2015.01)

(58) Field of Classification Search
None
See application file for complete search history.

(56) References Cited

U.S. PATENT DOCUMENTS

| | | |
|---|---|---|
| 2,914,504 A | 11/1959 | Metzger et al. |
| 4,812,506 A | 3/1989 | Gilmer et al. |
| 5,356,670 A | 10/1994 | Briggs et al. |
| 6,042,740 A | 3/2000 | Uehara et al. |
| 6,194,540 B1 | 2/2001 | Ito et al. |
| 6,454,817 B1 | 9/2002 | Shin et al. |
| 7,563,290 B2 | 7/2009 | Qui et al. |
| 7,651,637 B2 | 1/2010 | Sugihara |
| 7,658,986 B2 | 2/2010 | Poltorak et al. |

(Continued)

FOREIGN PATENT DOCUMENTS

WO    WO 2010/089111    8/2010

*Primary Examiner* — Seahvosh Nikmanesh
(74) *Attorney, Agent, or Firm* — Joseph T. Guy; Perkins Law Firm, LLC

(57) ABSTRACT

A process for preparing a solid electrolytic capacitor comprising application of coverage enhancing catalyst followed by application of a conducting polymer layer. Coverage enhancing catalyst is removed after coating and curing.

34 Claims, 6 Drawing Sheets

(56) References Cited

U.S. PATENT DOCUMENTS 9,030,807 B2 * 5/2015 Chacko et al. ............... 361/529
2010/0165548 A1 7/2010 Sugihara
2010/0172068 A1 7/2010 Yoshimitsu
2011/0273085 A1 11/2011 Garbar et al.

* cited by examiner

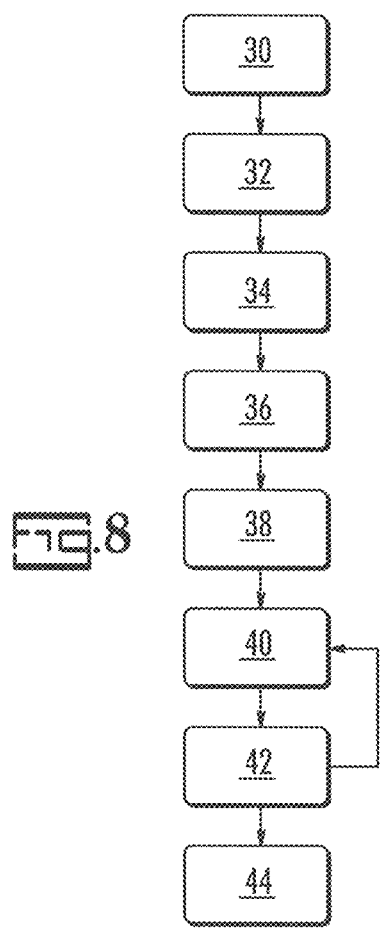

MATERIALS AND METHOD FOR IMPROVING CORNER AND EDGE COVERAGE OF SOLID ELECTROLYTIC CAPACITORS

CROSS-REFERENCE TO RELATED APPLICATIONS

The present application is a divisional application of U.S. patent application Ser. No. 13/396,842 filed Feb. 15, 2012 now U.S. Pat. No. 9,030,807 issued May 12, 2015 which, in turn, claims priority to U.S. Provisional Patent Appl. No. 61/443,051 filed Feb. 15, 2011 and to U.S. Provisional Patent Appl. No. 61/443,622 filed Feb. 16, 2011 both of which are incorporated herein by reference.

BACKGROUND

The present invention is related to an improved method of forming a solid electrolyte capacitor and an improved capacitor formed thereby. More specifically, the present invention is related to materials and methods for improving corner and edge coverage of solid electrolytic capacitors. The invention also discloses methods for manufacturing the same.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as polyaniline, polypyrrole, polythiophene and their derivatives. Solid electrolytic capacitors with intrinsically conductive polymers as the cathode material have been widely used in the electronics industry due to their advantageously low equivalent series resistance (ESR) and "non-burning/non-ignition" failure mode. In the case of conductive polymer cathodes the conductive polymer is typically applied by either chemical oxidation polymerization, electrochemical oxidation polymerization or spray techniques with other less desirable techniques being reported.

The backbone of a conductive polymer consists of a conjugated bonding structure. The polymer can exist in two general states, an undoped, non-conductive state, and a doped, conductive state. In the doped state, the polymer is conductive but of poor processability due to a high degree of conjugation along the polymer chain. In its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of the process, although during the process, the polymer can be undoped/doped to achieve certain process advantages.

Various types of conductive polymers including polypyrrole, polyaniline, and polythiophene are applied to the capacitors. The major drawback of conductive polymer capacitors, regardless of the types of conductive polymers employed, is their relatively low working voltage compared to their $MnO_2$ counterparts. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds with better reliability. For reasons which were previously unknown the break down voltage of capacitors comprising conductive polymers has been limited to about 55V thereby leading to a capacitor which can only be rated for use at about 25V. This limitation has thwarted efforts to use conductive polymers more extensively.

U.S. Pat. No. 7,563,290, which is incorporated herein by reference, describes the slurry/dispersion process. The resulting capacitors show excellent high voltage performances, reduced DC leakage (DCL) and improved long term reliability.

It is highly desirable that the capacitor devices are of high reliability and that they can withstand stressful environments. Therefore, the integrity of the anodes and the robustness of conductive polymer cathodes are essential for high quality capacitor products. However, it is a challenge to form a conductive polymer coating on the anodes that is defect-free, and which is capable of withstanding thermal mechanical stress during anode resin encapsulation and surface-mounting. The improper application of polymer slurry often leads to the formation of a poor polymer coating.

In a manufacturing process to produce conductive polymer based valve metal capacitors the valve metal powder, such as tantalum, is mechanically pressed into anodes that are subsequently sintered to form porous bodies. The anodes are anodized to a pre-determined voltage in a liquid electrolyte to form a dielectric layer onto which a cathode layer of conductive polymer is subsequently formed via an in situ polymerization process comprising multi-cycle oxidizer/monomer coatings and polymerization reactions. The anodes are then coated with graphite and Ag followed by assembling and molding into a finished device.

A particular concern is the formation of adequate polymer coatings on edges and corners. In order to achieve good quality polymer coating on anodes, especially on the corners and edges, many types of chemical compounds are used for either forming a pre-coating on the anode or which are added to the polymer slurry. U.S. Pat. No. 7,658,986, which is incorporated herein by reference, describes the difficulty in coating the edges and corners of the anode with polymer slurry. These materials tend to pull away from the corners and edges due to surface energy effects. The resulting thin coverage at corners and edges leads to poor reliability of the device.

One approach to mitigating poor coverage of the anode corners and edges has been to alter the design of the anode as disclosed in U.S. Pat. Nos. 7,658,986, D616,388, D599,309, and D586,767 each of which is incorporated herein by reference. While changes in the anode design are beneficial in some regards the effect of poor coverage is still present even with anode designs which facilitate corner and edge coverage by polymer slurry as the primary cathode layer.

Another approach for improving coverage of the corners and edges is provided in International Application WO2010089111A1, which is incorporated herein by reference, which describes a group of chemical compounds called crosslinkers, which are mostly multi-cationic salts or amines. International Application WO2010089111A1 teaches the application of a solution of the crosslinker on the anodes prior to the application of polymer slurry to achieve good polymer coverage on corners and edges of the anodes. The effectiveness of the crosslinker is attributed to the cross-linking ability of multi-cationic salts or amines to the slurry/dispersion particles. While crosslinkers are advantageous for improving the coating coverage on corners and edges of the anodes, the addition of these crosslinkers, which are mostly ionic in nature, has the unintended consequences of degrading the humidity performance of a finished product.

Cross linkers, by definition, link one polymer chain to another thus tending to be part of the polymer system. While crosslinkers are advantageous in many applications, it is undesirable to have an ionic crosslinker react to the polymer chain and be part of the polymer chain. Ionic materials, especially low molecular weight ionic compounds or mobile ionic compounds, can diffuse though various cathode layers, especially under humid conditions, and can cause higher leakage current. Unlike coavalently crosslinked molecules, ionically crosslinked molecules, have lower bond strength and can be disassociated when exposed to high temperature and high humidity conditions. Once disassociated, these mobile ions can cause higher leakage current. So a need exists for materials and methods which improves corner and edge coverage while not crosslinked with the polymer system.

SUMMARY OF THE INVENTION

It is an object of the invention to provide an improved solid electrolytic capacitor.

It is an object of the invention to provide an improved method of preparing a solid electrolytic capacitor cathode with good corner and edge coverage.

It has now been found that, surprisingly, corner and edge coverage can be improved using blocked or latent acid curing catalysts such as amine blocked sulfonic acids, amino acids, and quaternary amines.

It has now been found that, surprisingly, corner and edge coverage can be improved using dispersions of nanoparticles prior to applying conductive polymer dispersions to the surface.

Another object of the invention is to provide a material for accelerating or catalyzing surface adhesion in the polymer dispersion layer.

Another object of the invention is to provide a coverage enhancing catalyst which has the dual function of a catalysis as well as corner and edge coating enhancer.

Another object of the invention is to remove the material after it completes the catalysis and coating enhancing performance.

Another object of the invention is to provide coverage enhancing catalyst for improving the coating edges and corners while maintaining electrical properties.

A particular advantage of the invention is that the inventive molecules can accomplish their dual functions as catalysts and coverage enhancers and then can be removed with washing.

These and other advantages, as will be realized, are provided in a process for forming a solid electrolytic capacitor and an electrolytic capacitor formed by a process which includes:
providing an anode wherein the anode comprises a porous body and an anode wire extending from the porous body wherein the porous body has an average pore size;
forming a dielectric on the porous body to form an anodized anode;
coating the anodes with a thin layer conductive polymer;
applying a layer of catalyst on the conducting polymer; and
applying a layer of a second conducting polymer on the layer of catalyst.

Yet another embodiment is provided in a process for forming a solid electrolytic capacitor and a solid electrolytic capacitor prepared by the process. The process includes:
providing an anode wherein the anode comprises a porous body and an anode wire extending from the porous body wherein the porous body has an average pore size;
forming a dielectric on the porous body to form an anodized anode;
coating the anodes with a thin layer conductive polymer;
forming a layer of catalyst on the conductive polymer;
applying a second layer of conducting polymer;
drying and curing the conducting polymer layers; and
washing to remove the catalyst.

Yet another embodiment of the invention is provided in a method of forming an electrolytic capacitor comprising:
providing an anode with an anode lead extending therefrom;
forming a dielectric on the anode;
forming a conductive polymer layer on the dielectric;
forming a layer of coverage enhancement catalyst on the conductive polymer layer;
adding a subsequent layer of conductive polymer on the coverage enhancement catalyst; and
finishing the capacitor.

Yet another embodiment is provided in a method of forming an electrolytic capacitor comprising:
providing an anode with an anode lead extending therefrom;
forming a dielectric on the anode;
forming a conductive polymer layer on the dielectric;
applying a dispersion of nanoparticles to the conductive polymer layer and drying the dispersion to form a nanoparticle layer;
adding a subsequent layer of conductive polymer on the nanoparticle layer; and finishing the capacitor.

Yet another embodiment is provided in a capacitor. The capacitor has an anode and a dielectric on the anode. A conductive polymeric cathode is on the dielectric wherein the conductive polymeric cathode comprises a coverage enhancement catalyst.

BRIEF DESCRIPTION OF FIGURES

FIG. 8 illustrates a method of the claimed invention in flow chart representation.

DESCRIPTION

The present invention is related to an improved capacitor and a method for making the improved capacitor. More particularly, provided herein is a method that allows the production of capacitors with improved corner and edge coverage.

The invention will be described with reference to the figures forming an integral, non-limiting, component of the disclosure. Throughout the various figures similar elements will be numbered accordingly.

Figure 6:
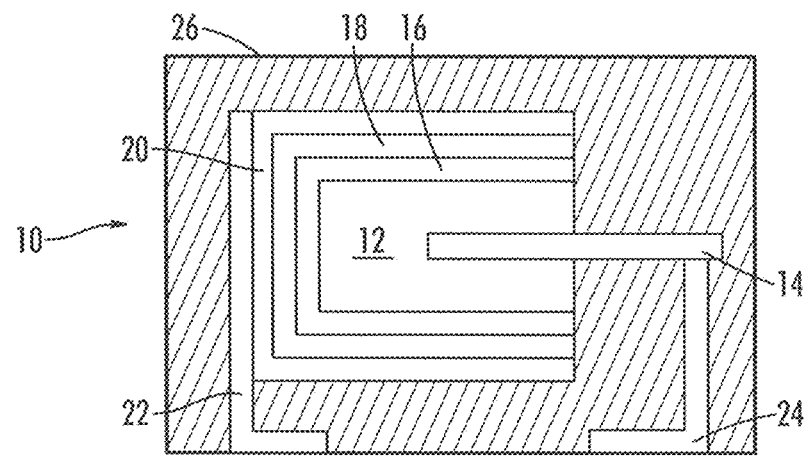
FIG. 6 schematically illustrates a capacitor in schematic cross-sectional view.

An embodiment of the invention is illustrated in schematic cross-sectional view in FIG. 6. In FIG. 6, a capacitor, generally represented at 10, comprises an anode, 12, with an anode wire, 14, extending therefrom. A dielectric, 16, is on the anode at least partially encasing the anode. A conductive polymeric cathode, 18, is on the dielectric and separated from the anode by the dielectric. Adhesion layers, 20, provide a layer which allows adhesion to a cathode external termination, 22. An anode external termination, 24, is in electrical contact with the anode wire. The entire capacitor, except for the lower portion of the anode and cathode external terminations, is preferably encased in a non-conductive matrix, 26 or sealed in a metal can as known in the art.

Figure 7:
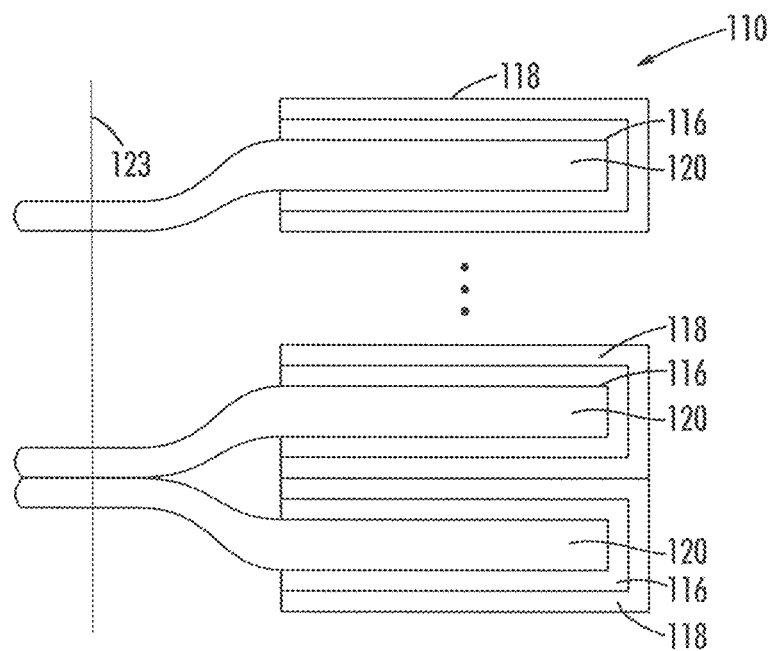
FIG. 7 schematically illustrates a capacitor in schematic cross-sectional view.

An embodiment of the invention is illustrated in FIG. 7 wherein a capacitor is generally represented at 110. A series of anodes, 120, are arranged in parallel fashion. Each anode has a dielectric, 116, thereon. A conductive polymer cathode, 118, is on each dielectric. The anodes are fused at 123 and the cathodes are commonly terminated.

An embodiment of the invention is illustrated in flow-chart form in FIG. 8. In FIG. 8, an anode is provided at 30. A dielectric is formed on the anode at 32. An initial coating of conductive polymer is formed at 34 preferably by in-situ chemical polymerization. A particularly preferred conductive polymer is poly 3,4-ethylenedioxythiophene (PEDT). PEDT can be made by in situ polymerization of ethylenedioxythiophene (EDT) monomer such as Clevios M V2 which is commercially available from Hereaeus with an oxidizer such as ferric tosylate solution available as Clevios® C from Hereaeus. In one embodiment the oxidizer is applied first by dipping following by dipping and drying in a monomer solution. An optional layer of coverage enhancing catalyst can be applied on the initial coating of conductive polymer at 36. A conductive polymeric coating is applied at 38 by dipping in a slurry of conductive polymer. To achieve the desired thickness of conductive polymer, sequential repeated steps of forming a coverage enhancing catalyst layer at 40 is followed by forming a conductive polymeric layer at 42. The conductive polymeric layer is preferably formed by dipping in a slurry of conductive polymer. Once the desired thickness of conductive polymer is achieved the capacitor is finished at 44 by forming anodic and cathode external terminations and optionally encapsulating or sealing the capacitor.

Blocked acid catalysts or latent acid curing catalysts are known for their delayed catalysis of acid curable functionalities. Such catalysts and their applications are described in U.S. Pat. Nos. 4,835,227; 4,812,506 and 5,356,670. Most common blocked acid catalysts are sulfonic acids blocked with monoamine functionality. Amino acids, such as glycine, are reported in U.S. Pat. No. 2,914,504 to function as latent acid cure catalyst. It has been found surprisingly that these molecules are very effective for improving the edge and corner coverage of solid electrolytic capacitors containing intrinsically conducting polymer (ICP) dispersion coatings. It is believed that their effectiveness is attributed to their ability to precipitate on the corner and edges of the capacitor. The presence of this precipitated material on the corners and edges and their ionic interaction with the internal polymer and external ICP dispersion/slurry coating layer enhances their affinity to the interfaces. These forces of interaction are believed to be stronger than the surface tension, related to dewetting forces on the corners and edges, thus preventing the materials from dewetting away from corners and edges. Once these materials are attached to the corners and edges, the blocked catalysts can be activated to deblock/deprotect the amine functionality. The amine is now liberated during thermal activation thus not hindering the conductivity. The instant invention is particularly advantageous when the presence of catalyst in the conducting polymer solution affect shelf stability. Here the preferred method is to apply catalyst as a separate layer or a layer between conducting polymer layers and catalyzed by exposure to heat.

Another family of catalysts showing good coverage properties are phase transfer catalysts such as cetyl trimethyl ammonium bromide (CTAB). It was surprisingly found that this molecule enhances the coverage significantly while improving the hydrophobicity of the system.

So by the materials and method of this invention, a family of molecules with dual function properties is identified. These dual function molecules will be referred to as coverage enhancing catalysts throughout the discussion. Through diligent research, it has been realized that the use of these catalysts compounds for improved polymer coverage results in products with good leakage and ESR performance.

In one embodiment the coverage enhancing catalysts compounds comprise amine blocked acids defined by:

Formula 1 wherein $R^1$ is a hydrogen, an aliphatic group, an aromatic group, an akylaryl group, or a heterocyclic group. In preferred embodiments $R^1$ is selected from hydrogen, a straight chain or branched alkyl of 1-6 carbons and phenyl alkylene. Particularly preferred embodiments represented by Formula I are glycine, alanine and lysine.

In one embodiment of the invention the coverage enhancing catalysts are amine blocked acids included amine blocked sulphonic acid amines defined by:

Formula 2 wherein $R^2$ is an aliphatic hydrocarbon with up to 18 carbons, unsubsituted phenyl or a phenyl substituted with halogen, —OH, —COOH, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$;

$R^3$ is aliphatic hydrocarbon with up to 18 carbons, unsubsituted phenyl or a phenyl substituted with halogen, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$. In a particularly preferred embodiment $R^3$ is selected from a phenyl ring optionally substituted with at least one of an alkyl, a hydroxyl or a carboxylic acid.

Particularly preferred compounds represented by Formula 2 include:

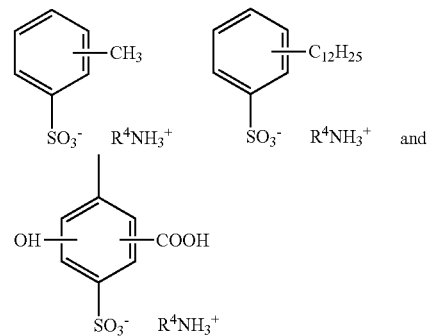

wherein $R^4$ is aliphatic hydrocarbon with up to 18 carbons, unsubsituted phenyl or a phenyl substituted with halogen, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$.

In one embodiment of the invention the coverage enhancing catalysts are quaternary amines defined by the formula:

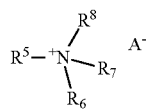

Formula 3 wherein:
$R^5$-$R^8$ independently represent aliphatic hydrocarbons with up to 30 carbons or an aromatic hydrocarbon with 6-20 carbons. The aliphatic hydrocarbon can be unsubstituted or substituted with carboxyl or alcohol groups. The aromatic hydrocarbon can be unsubstituted or substituted with carboxyl, alcohol or alkyl groups. A is a counterion selected from the group consisting of halide, and sulfonic acid as defined by $R^2SO_3^-$ above. A particularly preferred embodiment of Formula 3 is $C_{16}H_{33}N(CH_3)_3^+Br$.

The term aliphatic includes straight, branched, saturated, unsaturated, substituted and unsubstituted. The term aromatic includes substituted and unsubstituted.

Another coverage adhesion catalyst is a nanoparticle dispersion wherein a conductive polymer slurry is applied onto a nanoparticle dispersion to form a layer that covers the edges and corners of the anodes. The sequence of applying the nanoparticle dispersion material followed by applying a conductive polymer layer is repeated until the desired layer thickness is reached. Without limit thereto, 2-10 cycles of the nanoparticle dispersion and conductive polymer layer application is suitable for demonstration of the invention. Nanoparticle dispersions comprise nanoparticles with the particle size of the nanoparticle of no more than 100 nm and preferably no more than 50 nm. Nanoparticles of the nanoparticle dispersion are selected from aluminum oxide, zinc oxide, silicon oxide and cerium oxide. These nanoparticle dispersions are available from Byk Additives and Instruments under the commercial name Nanobyk 3600 for aluminum oxide, Nanobyk 3810 for cerium oxide and Nanobyk 3820 for zinc oxide.

A coverage enhancement catalyst with an aliphatic hydrocarbon with above 30 carbons has a diminished effectiveness as a coverage enhancement catalyst. In the coverage enhancement catalyst an aromatic hydrocarbon is listed as 6-20 carbons with the understanding the increments within the range are necessary to achieve aromaticity. An aromatic hydrocarbon in the coverage enhancement catalyst with above about 20 carbons has diminished effectiveness as a coverage enhancement catalyst.

Solid electrolytic capacitors generally comprise a porous metal anode, an oxide layer on the anode, typically an oxide of the anode metal, and an electrically conductive solid cathode, such as manganese dioxide or an intrinsically conductive polymer, incorporated into the pores and onto the dielectric. Additional layers, such as silver and carbon layers, are then added to aid in contact formation.

The solid electrolytic capacitors typically incorporate valve metals or conductive oxides of valve metals with tantalum, aluminum, niobium and niobium oxide being mentioned as particularly preferred. An advantage of the high surface area is that a very high capacitance density can be achieved.

Conjugated polymers are particularly suitable for use as the electrically conductive solid cathode with polyaniline, polypyrroles and polythiophenes being most preferred. A particularly preferred polymer for use as a cathode is polythiophene. The polymer precursors are polymerized to form the conductive layer which functions as the cathode of the capacitor. The polymer precursors are preferably polymerized by either electrochemical or chemical polymerization techniques with oxidative chemical polymerization being most preferred. In one embodiment, the conductive layer is formed by dipping the anodized substrate first in a solution of an oxidizing agent such as, but not necessarily limited to iron (III) p-toluenesulfonate. After a drying step, the anode bodies are then immersed in a solution comprising monomer and oligomer of the conductive polymer and solvents.

It is preferred to include a dopant in the polymer as known in the art. The dopant can be coated separately or included in the polymer slurry or monomer solution. A particularly preferred dopant is the sodium salt of polystyrenesulfonate (PSS).

In one embodiment a polymer precursor comprising a monomer and conjugated oligomer is used. The monomer preferably represents about 75-99.9 wt % of the polymer precursors and the conjugated oligomer preferably represents about 0.1-25 wt % of the polymer precursors. More preferably the monomer represents about 90-99.9 wt % of the polymer precursors and the conjugated oligomer represents about 0.1-10 wt % of the polymer precursors. Even more preferably the monomer represents about 95-99.5 wt % of the polymer precursors and the conjugated oligomer represents about 0.5-5 wt % of the polymer precursors. The preferred monomer is a compound of Formula I and the preferred oligomer is a compound of Formula II.

The conducting polymer is preferably an intrinsically conducting polymer comprising repeating units of a monomer of Formula I and optionally an oligomer Formula II:

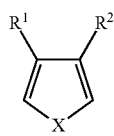

FORMULA I

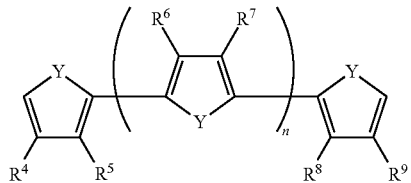

FORMULA II $R^1$ and $R^2$ of Formula I and $R^4$-$R^9$ of Formula II are preferably chosen to prohibit polymerization at the p-site of the ring. It is most preferred that only a-site polymerization be allowed to proceed. Therefore, it is preferred that $R^1$ and $R^2$ are not hydrogen. More preferably $R^1$, $R^2$, $R^4$, $R^5$, $R^6$, $R^7$, $R^8$ and $R^9$ are a-directors. Therefore, ether linkages are preferable over alkyl linkages. It is most preferred that the groups are small to avoid steric interferences. For these reasons $R^1$ and $R^2$, $R^4$ and $R^5$, $R^6$ and $R^7$ or $R^8$ and $R^9$ each taken together as —O—$(CH_2)_2$—O— is most preferred.

In Formula II n is an integer selected from 0-3.

In Formulas I and II, X and Y independently are S, Se or N. Most preferably X and Y are S.

$R^1$, $R^2$, $R^4$, $R^5$, $R^6$, $R^7$, $R^8$ and $R^9$ independently represent linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, $R^4$ and $R^5$, $R^6$ and $R^7$ or $R^8$ and $R^9$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_1$-$C_{18}$ alkoxyalkyl; or are $C_3$-$C_8$ cycloalkyl, phenyl or benzyl which are unsubstituted or substituted by $C_1$-$C_6$ alkyl.

More preferably $R^1$, $R^2$, $R^4$, $R^5$, $R^6$, $R^7$, $R^8$ and $R^9$, independently of one another, represent —$CH_3$, —$CH_2CH_3$; —$OCH_3$; —$OCH_2CH_3$ or most preferably $R^1$ and $R^2$, $R^4$ and $R^5$, $R^6$ and $R^7$ or $R^8$ and $R^9$ are taken together to represent —$OCH_2CH_2O$— wherein the hydrogen can be replaced with a solubilizing group, a halide or an alkyl.

Terms and chemical formulas used herein to refer to alkyl or aryl moieties refer to either the substituted or unsubstituted moiety unless specifically stated otherwise. A solvent is defined as a single solvent or a mixture of solvents.

The synthesis of conjugated dimers and trimers is well known in the literature. For example, the dimer of 3,4-ethylenedioxythiophene can be made through Ulmann coupling of the monomers with alkyl lithium and cupric chloride [J. Kagan and S. K. Arora, Heterocycles, 20 (1983) 1937].

Conjugated and non-conjugated dimers can be distinguished by Fourier transform infrared (FT-IR) spectroscopy, and by nuclear magnetic resonance (NMR). The content of the conjugated as well as non-conjugated dimers in the monomer can be measured by gas chromatograph (GC).

The polymer layer can be formed by in-situ polymerization on the surface or by applying a slurry of polymer onto the dielectric coating such as by dipping or spraying. These techniques are described in the literature and are widely understood and will not be further explained herein. Achieving adequate coverage of the edges and corners is difficult as set forth above. The choice of method for forming the polymer layer is selected based, in part, on the location of the layer being formed. It is widely known that a conductive polymer layer is typically formed by multiple applications of thinner layers each of which may be formed by either in-situ polymerization or by slurry dipping.

It is preferable to apply the solution of dispersion comprising the conductive polymer or coverage enhancement catalyst at a pH of no more than 10 and more preferably no more than 8 with below 7 being more preferred and below 6 being especially preferred.

The coverage enhancing catalyst is preferably applied to the conductive polymer layer as a solution by dipping or by spraying. The catalyst solution preferably comprises at least 3 wt % to no more than 30 wt % of catalyst. More preferably the catalyst solution preferably comprises at least 6 wt % to no more than 10 wt % of catalyst and even more preferably the catalyst solution preferably comprises at least 7 wt % to no more than 9 wt % of catalysts at room temperature.

The coverage enhancing catalyst can be applied to the corners or edges. it is preferable that, at least, the edges and corners have catalyst. It is more practical to apply catalyst to the entire outer surface of the capacitor body. It is preferable to at least partially remove any solvent or dispersant with thermal removal at temperatures of 15° C. to 200° C., and more preferably 50° C. to 150° C.

A subsequent layer of conductive polymer dispersion is applied onto the dried coverage enhancing catalyst material to form a layer that covers the edges and corners of the anodes. The sequence of applying the coverage enhancing catalysts material followed by applying a conductive polymer layer is repeated many times until the desired layer thickness is reached. Without limit thereto 2-10 cycles of catalyst material and conductive polymer layer application is suitable for demonstration of the invention. Each application of a dried catalyst material may be with a unique catalyst material and/or concentration of catalyst material or the applications may be with an identical or similar material. Similarly, each application of the conductive polymer may use a unique composition and a unique solution or an identical or similar material may be used for the various dipping steps.

After the desired number of polymer layers are formed, or the desired thickness is achieved, it is preferable to apply layers which facilitate adhesion to a lead frame. Conductive carbon layers followed by conductive metal layers, particularly noble metal or semi-noble metal layers, are formed on the conductive polymer. The capacitor is finished after attaching to external leads, encapsulation, testing, packaging and the like.

Based on the surprising results detailed herein, the effectiveness of catalyst is related to its quantity in or on the surface being polymer coated with higher solution concentrations of catalyst yielding better polymer coverage on corners and edges of anodes.

In one embodiment the polymer layers are washed to remove any catalyst material. After the desired number of polymer layers is formed, or the desired thickness is achieved, it is preferable to apply layers which facilitate adhesion to a lead frame. Conductive carbon layers followed by conductive metal layers, particularly noble metal layers, are formed on the conductive polymer. The capacitor is finished which may include attachment to external leads, encapsulation, testing, packaging and the like.

In a particularly preferred embodiment a proper catalyst concentration and slurry dipping procedure is combined with a post process wash. A polymer coating is first formed on the dielectric, preferably by dipping the anode with the dielectric thereon into a slurry of polymer. After polymer coating a coverage enhancing catalysts is applied followed by an alternating application of polymer and coverage enhancing catalysts. At least once prior to completion of the polymer coating buildup the polymer is washed with dionized water or methanol as detailed further herein.

EXAMPLES

Comparative Example 1

A series of V case 33 µF tantalum anodes were anodized at 80V. A thin coating of polyethylenedioxythiophene polymer (PEDOT) was applied on the dielectric of the anodes via an in-situ chemical polymerization process to achieve full capacitance. The anodes were then coated with conductive polymer dispersion. The above processes were repeated 4 more times. The parts were analyzed by SEM for polymer coverage.

Comparative Example 2

A series of V case 33 µF tantalum anodes were anodized at 80V. A thin coating of conductive polymer (PEDOT) was applied onto the anodes via an in-situ chemical polymerization process. The anodes were first coated with conductive polymer dispersion. After drying, alternating layers of a commercial crosslinker (Clevios K primer) and conductive polymer dispersion were applied and repeated 3 more times. The parts were analyzed by SEM for polymer coverage. Graphite and Ag coatings were applied and the samples electrical properties were analyzed. The electrical properties are recorded in Table 1.

Inventive Example 1

Figure 1A:
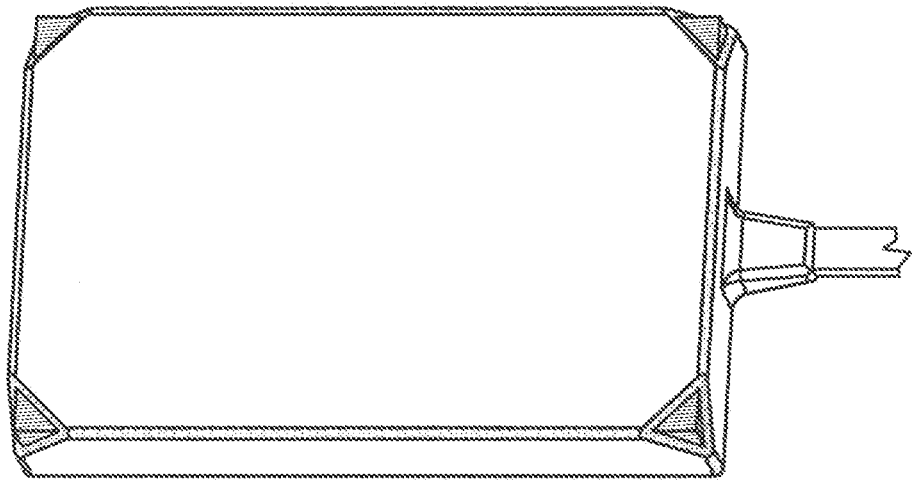
FIGS. 1A, 1B, 2A, 2B, 3A, 3B, 4 and 5 illustrate the polymer coverage with and without the inventive coverage enhancing catalysts.
Figure 1B:
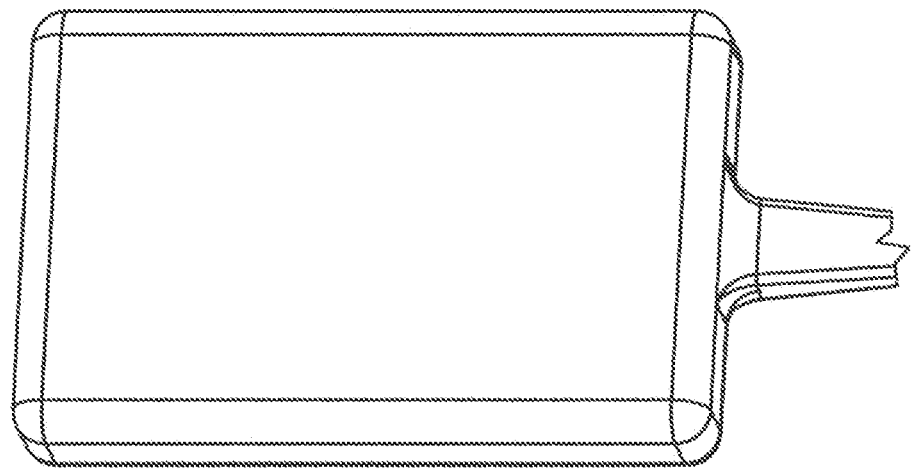

A series of 33 μF tantalum anodes were anodized at 80V. A thin coating of conductive polymer (PEDOT) was applied onto the anodes via an in-situ chemical polymerization process. The anodes were first coated with a conductive polymer dispersion. After drying, alternating layers of inventive coverage enhancing catalyst, 7% amine blocked sulphonic acid $C_6H_4(OH)(COOH)SO_3^-R'NH_3^+$ available from King Industries, Inc. as K-Pure™ CXC 1767 and conductive polymer dispersion were applied and repeated 3 more times. The parts dried and cured and then washed in methanol to remove the coverage enhancing catalysts. The parts were analyzed by SEM for polymer coverage. FIG. 1 shows coverage comparison between the Comparative Example 1, as 1a, and Inventive Example 1, as 1b. Graphite and Ag coatings were applied and the samples electrical properties were analyzed. Electrical properties are recorded in Table 1.

Inventive Example 2

The experiment was repeated as in Inventive Example 1 except that the coverage enhancing catalyst used was amine blocked sulphonic acid $C_6H_3(CH_3)SO_3^-R'NH_3^+$ available from King Industries, Inc. as K-Pure™ CXC 1207. Electrical properties are recorded in Table 1.

Inventive Example 3

An experiment was repeated as in Inventive Example 1 except that the coverage enhancing catalyst used was amine blocked sulphonic acid $C_6H_4(C_{12}H_{25})SO_3^-R'NH_3^+$ available from King Industries, Inc. as K-Pure™ CXC 1768. Electrical properties are recorded in Table 1.

Inventive Example 4

Figure 2A:
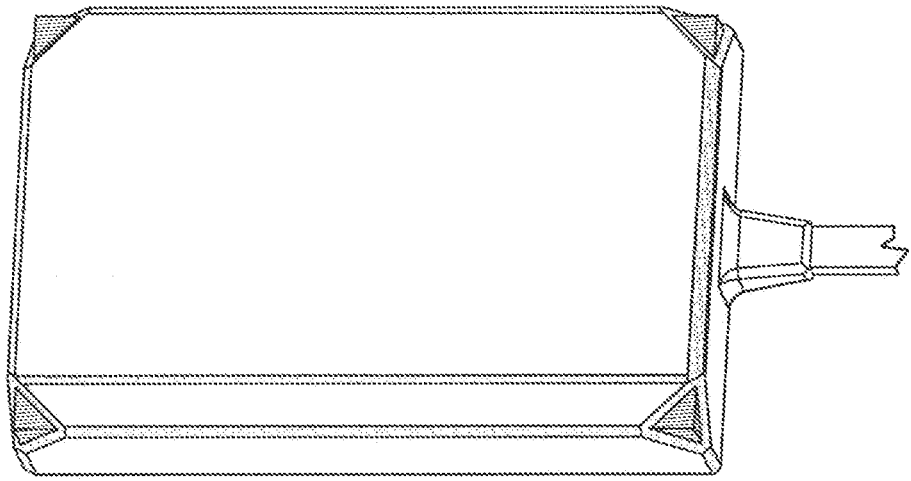
Figure 2B:
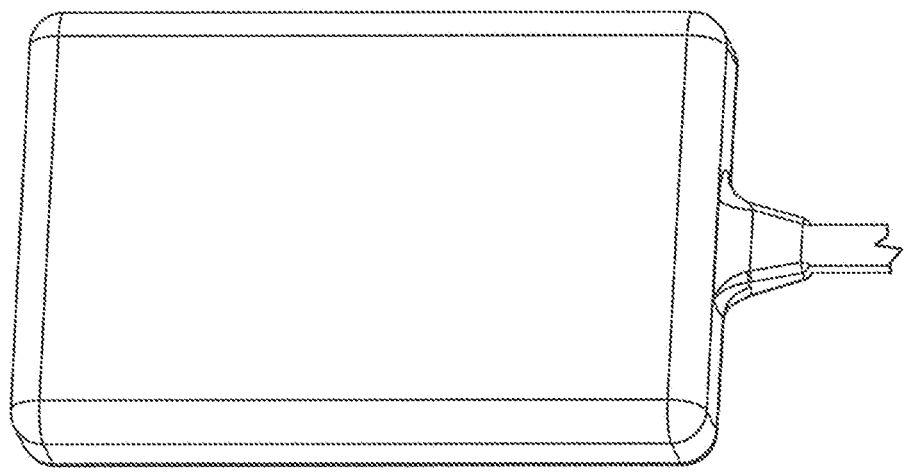

A series of 33 μF tantalum anodes were anodized at 80V. A thin coating of conductive polymer (PEDOT) was applied onto the anodes via an in-situ chemical polymerization process. The anodes were first coated with conductive polymer dispersion. After drying, alternating layers of inventive coverage enhancing catalyst, amino acid 4.5% glycine and conductive polymer dispersion were applied and repeated 3 more times. The parts were analyzed by SEM for polymer coverage. FIG. 2 shows coverage comparison between the Comparative Example 1, as 2a, and Inventive Example 4, as 2b.

Inventive Example 5

Figure 3A:
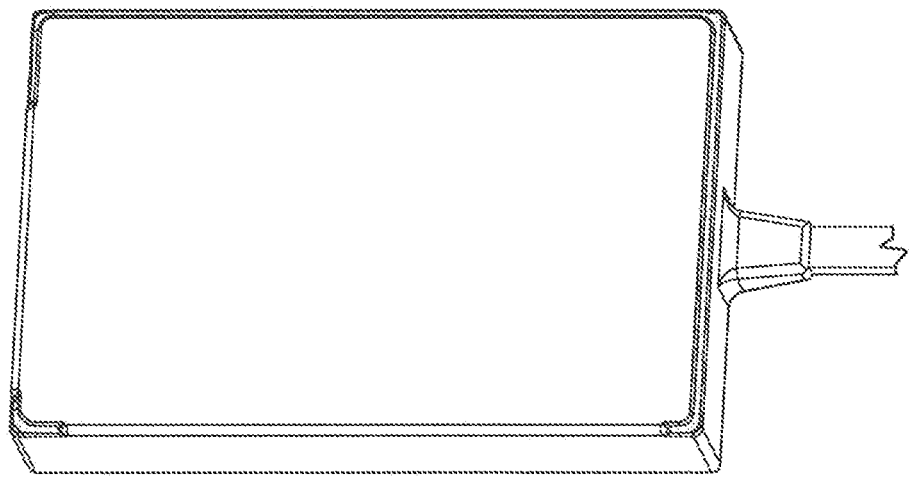
Figure 3B:
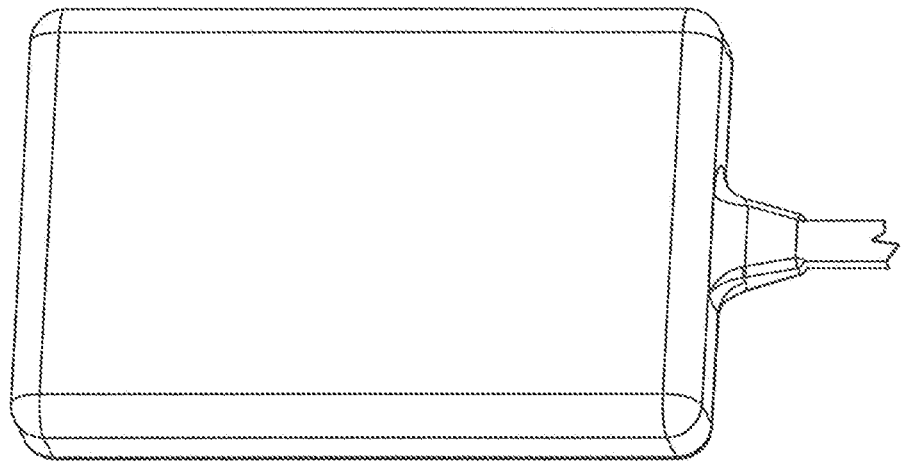

A series of 470 μF tantalum anodes were anodized at 18 V. A thin coating of conductive polymer (PEDOT) was applied onto the anodes via an in-situ chemical polymerization process. The anodes were first coated with conductive polymer dispersion. After drying, alternating layers of inventive coverage enhancing catalyst, 8% hexadecyl-trimethyl-ammonium bromide $(C_{16}H_{33})N(CH_3)_3Br$, also referred to as cetrimonium bromide, solution in ethanol and conductive polymer dispersion were applied and repeated 3 more times. The parts were analyzed by SEM for polymer coverage. FIG. 3 shows coverage comparison between the Comparative Example, as 3a, and Inventive Example 5, as 3b.

TABLE 1

Electrical properties of comparative and inventive examples

| Process | Capacitance (microfarad) | Dissipation Factor (%) | ESR (mohm) | Leakage (microamp) |
|---|---|---|---|---|
| Comparative example 2 | 34.38 | 5.13 | 36.29 | 0.264 |
| Inventive example 1 | 34.34 | 4.80 | 40.82 | 0.303 |
| Inventive example 2 | 34.71 | 4.99 | 36.89 | 0.284 |
| Inventive example 3 | 34.59 | 4.84 | 38.83 | 0.629 |

Table 1 suggests that the various coverage enhancing catalysts gave comparable electrical performance as the coverage enhancement catalyst in comparative example 1. FIG. 1-3 suggests that the inventive molecules significantly improves coverage compared to the parts without the inventive molecules.

Inventive Example 6

Figure 4:
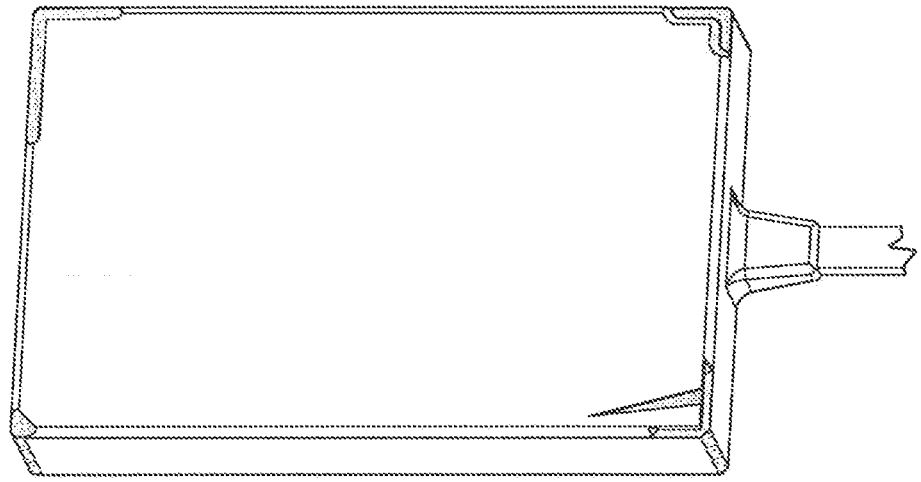
Figure 5:
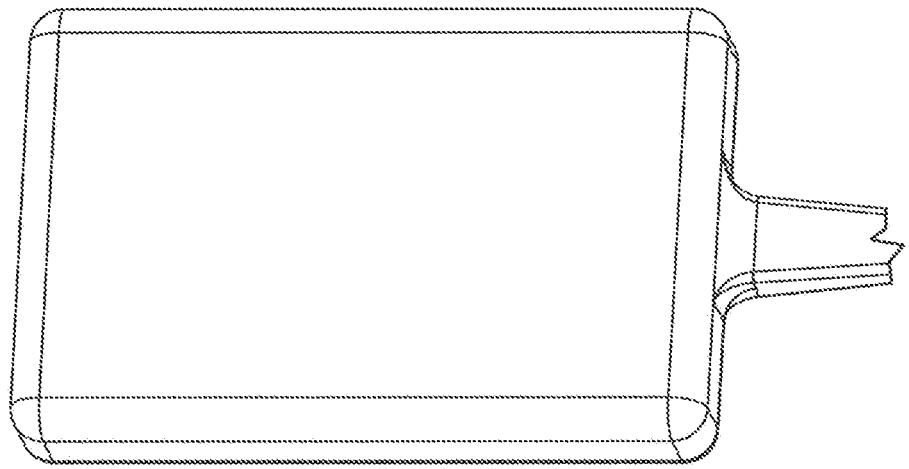

A series of 33 μF tantalum anodes were anodized at 80V. A thin coating of conductive polymer (PEDT) was applied onto the anodes via an in-situ chemical polymerization process. The anodes were first coated with conductive polymer dispersion. After drying, alternating layers of an aluminum nanoparticle dispersion available from Byk Additives and Instruments as 5.5% Nanobyk 3600, with an avg. particle size of 40 nm and conductive polymer PEDT dispersion were applied sequentially and repeated 3 more times. The parts were analyzed by SEM for polymer coverage. FIGS. 4 and 5 show a coverage comparison between a Comparative Example, with no coverage enhancing catalysts and Inventive Example 6.

The invention has been described with reference to the preferred embodiments without limit thereto. One of skill in the art would realize additional embodiments and alterations which are not specifically stated but which are within the scope of the invention as set forth in the claims appended hereto.

The invention claimed is:

1. A method of forming an electrolytic capacitor comprising:
   providing an anode with an anode lead extending therefrom;
   forming a dielectric on said anode;
   forming a conductive polymer layer on said dielectric;
   forming a layer of coverage enhancement catalyst on said conductive polymer layer;
   adding a subsequent layer of conductive polymer on said coverage enhancement catalyst; and
   finishing said capacitor.

2. The method for forming an electrolytic capacitor of claim 1 further comprising activating said coverage enhancement catalyst.

3. The method for forming an electrolytic capacitor of claim 2 wherein said activating is by heat.

4. The method for forming an electrolytic capacitor of claim 1 further comprising washing prior to said finishing.

5. The method for forming an electrolytic capacitor of claim 1 wherein said forming a conductive polymer layer on said layer of dielectric comprises in-situ polymerization.

6. The method for forming an electrolytic capacitor of claim 1 further comprising dipping in a slurry of conductive polymer prior to said forming a layer of coverage enhancement catalyst.

7. The method for forming an electrolytic capacitor of claim 1 wherein said coverage enhancement catalyst is defined by Formula 1:

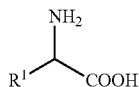

Formula 1 wherein $R^1$ is a hydrogen, an aliphatic group, an aromatic group, an akylaryl group, or a heterocyclic group.

8. The method for forming an electrolytic capacitor of claim 7 wherein $R^1$ is selected from hydrogen, a straight chain or branched alkyl of 1-6 carbons and phenyl.

9. The method for forming an electrolytic capacitor of claim 7 wherein said coverage enhancement catalyst is selected from the group consisting of glycine, alanine and lysine.

10. The method for forming an electrolytic capacitor of claim 1 wherein said coverage enhancement catalyst is defined by Formula 2:

$$R^2\text{—}SO_3^-R^3NH_3^+ \qquad \text{Formula 2}$$

wherein $R^2$ is an aliphatic hydrocarbon with up to 18 carbons, unsubstituted phenyl or a phenyl substituted with halogen, —OH, —COOH, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$;

$R^3$ is aliphatic hydrocarbon with up to 18 carbons, unsubstituted phenyl or a phenyl substituted with halogen, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C1$-$C4$ alkoxy, $C_5$-$C_6$ cycloalkyl, $C_7$-$C_9$ aralkyl, camphoryl, —$CF_3$, —$CCl_3$, —F or —$NH_2$.

11. The method for forming an electrolytic capacitor of claim 10 wherein $R^3$ is selected from a phenyl ring optionally substituted with at least one of an alkyl, a hydroxyl or a carboxylic acid.

12. The method for forming an electrolytic capacitor of claim 10 wherein said coverage enhancement catalyst is selected from the group consisting of:

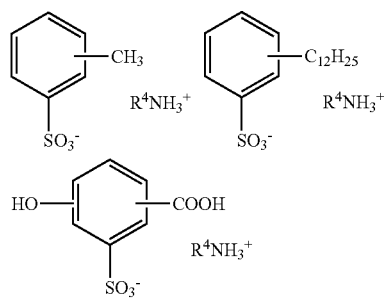

wherein $R^4$ is aliphatic hydrocarbon with up to 18 carbons, unsubstituted phenyl or a phenyl substituted with halogen, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$.

13. The method for forming an electrolytic capacitor of claim 1 wherein said coverage enhancement catalyst is defined by Formula 3:

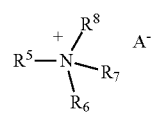

Formula 3 wherein:
$R^5$-$R^8$ independently represent aliphatic hydrocarbons with up to 30 carbons or an aromatic hydrocarbon with 6-20 carbons; and
A is a counterion selected from the group consisting of halide and sulfonic acid.

14. The method for forming an electrolytic capacitor of claim 13 wherein said aliphatic hydrocarbon can be unsubstituted or substituted with carboxyl or alcohol groups.

15. The method for forming an electrolytic capacitor of claim 13 wherein said aromatic hydrocarbon can be unsubstituted or substituted with carboxyl, alcohol or alkyl groups.

16. The method for forming an electrolytic capacitor of claim 13 wherein A is defined by $R^2SO_3$— wherein $R^2$ is an aliphatic hydrocarbon with up to 18 carbons, unsubstituted phenyl or a phenyl substituted with halogen, —OH, —COOH, $C_1$-$C_{12}$ alkyl, $C_1$-$C_4$ alkoxy, $C_1$-$C_4$ alkyl-CONH, phenyl-CONH, $NO_2$, or benzyl; naphthyl which is unsubstituted or substituted with halogen, $C_1$-$C_{12}$ alkyl, $C_1$-$C_4$ alkoxy, $C_5$-$C_6$ cycloalkyl, $C_7$-$C_9$ aralkyl, camphoryl, —$CF_3$, —$CCl_3$, —F or —$NH_2$.

17. The method for forming an electrolytic capacitor of claim 13 wherein said coverage enhancement catalyst is $C_{13}H_{33}N(CH_3)_3^+Br^-$.

18. The method for forming an electrolytic capacitor of claim 1 wherein said coverage enhancement catalyst is a nanoparticle.

19. The method for forming an electrolytic capacitor of claim 18 wherein said nanoparticle is added as a dispersion.

20. The method for forming an electrolytic capacitor of claim 18 wherein said nanoparticle has an average particle size of the nanoparticle of no more than 100 nm.

21. The method for forming an electrolytic capacitor of claim 20 wherein said nanoparticle has an average particle size of the nanoparticle of no more than 50 nm.

22. The method for forming an electrolytic capacitor of claim 18 wherein said nanoparticle are selected from aluminum oxide, zinc oxide, silicon oxide and cerium oxide.

23. The method for forming an electrolytic capacitor of claim 1 wherein said anode comprises a valve metal.

24. The method for forming an electrolytic capacitor of claim 23 wherein said valve metal is selected from a group consisting of a valve metal and a conductive oxide of a valve metal.

25. The method for forming an electrolytic capacitor of claim 23 wherein said anode comprises a material selected from the group consisting of tantalum, aluminum, niobium and niobium oxide.

26. The method for forming an electrolytic capacitor of claim 1 wherein said conductive polymer is selected from the group consisting to polyaniline, polythiophene and polypyrole.

27. The method for forming an electrolytic capacitor of claim 26 wherein said conductive polymer is poly-3,4-ethylenedioxythiophene.

28. The method for forming an electrolytic capacitor of claim 1 further comprising forming a subsequent layer of coverage enhancement catalyst on said subsequent conductive polymer layer.

29. The method for forming an electrolytic capacitor of claim 1 comprising multiple cycles of said forming conductive polymer layer said forming coverage enhancement catalyst layer.

30. The method for forming an electrolytic capacitor of claim 1 comprising 2-10 of said cycles.

31. A method of forming an electrolytic capacitor comprising:

providing an anode with an anode lead extending therefrom;
forming a dielectric on said anode;
forming a conductive polymer layer on said dielectric;
applying a dispersion of nanoparticles to said conductive polymer layer and drying said dispersion to form a nanoparticle layer;
adding a subsequent layer of conductive polymer on said nanoparticle layer; and
finishing said capacitor.

32. The method for forming an electrolytic capacitor of claim 31 wherein said nanoparticle has an average particle size of the nanoparticle of no more than 100 nm.

33. The method for forming an electrolytic capacitor of claim 32 wherein said nanoparticle has an average particle size of the nanoparticle of no more than 50 nm.

34. The method for forming an electrolytic capacitor of claim 31 wherein said nanoparticle are selected from aluminum oxide, zinc oxide, silicon oxide and cerium oxide.

* * * * *